United States Patent
Lecourtier

(10) Patent No.: US 9,517,837 B2
(45) Date of Patent: Dec. 13, 2016

(54) METHOD FOR REDUCING THE APPARENT MANOEUVRING TIME FOR LANDING GEAR OF AN AIRCRAFT

(71) Applicant: MESSIER-BUGATTI-DOWTY, Velizy Villacoublay (FR)

(72) Inventor: Gilbert Lecourtier, Velizy-Villacoublay (FR)

(73) Assignee: MESSIER-BUGATTI-DOWTY, Velizy-Villacoublay (FR)

( * ) Notice: Subject to any disclaimer, the term of this patent is extended or adjusted under 35 U.S.C. 154(b) by 120 days.

(21) Appl. No.: 14/541,451

(22) Filed: Nov. 14, 2014

(65) Prior Publication Data
US 2015/0144735 A1 May 28, 2015

(30) Foreign Application Priority Data

Nov. 22, 2013 (FR) ...................... 13 61528

(51) Int. Cl.
| | | |
|---|---|---|
| *G01C 23/00* | (2006.01) | |
| *B64C 25/10* | (2006.01) | |
| *B64C 25/26* | (2006.01) | |
| *B64C 25/16* | (2006.01) | |
| *B64C 25/20* | (2006.01) | |

(52) U.S. Cl.
CPC .............. *B64C 25/26* (2013.01); *B64C 25/16* (2013.01); *B64C 25/20* (2013.01)

(58) Field of Classification Search
USPC .......................................... 701/3; 244/102 R
See application file for complete search history.

(56) References Cited

U.S. PATENT DOCUMENTS

| | | | | |
|---|---|---|---|---|
| 6,854,689 B1* | 2/2005 | Lindahl | .................... | B64C 25/16 244/102 R |
| 9,004,401 B2* | 4/2015 | Evans | ..................... | B64C 25/26 244/102 A |
| 2003/0011493 A1* | 1/2003 | Wiplinger | .......... | B64D 45/0005 340/960 |
| 2003/0033927 A1* | 2/2003 | Bryant | .................. | B64C 25/001 91/471 |
| 2009/0187293 A1 | 7/2009 | Trotter et al. | | |
| 2010/0084509 A1* | 4/2010 | Weaver | .................... | B64C 25/16 244/102 R |
| 2011/0024557 A1* | 2/2011 | Brighton | ................ | B64C 25/20 244/102 SL |
| 2012/0037752 A1* | 2/2012 | Collins | ................... | B64C 25/26 244/102 SL |
| 2012/0234971 A1* | 9/2012 | Bugash | .............. | B64D 45/0005 244/102 R |
| 2013/0026291 A1* | 1/2013 | Way | ........................ | B64C 25/16 244/102 R |
| 2015/0144735 A1* | 5/2015 | Lecourtier | .............. | B64C 25/16 244/102 R |

FOREIGN PATENT DOCUMENTS

EP    2 082 956 A2    7/2009

OTHER PUBLICATIONS

French Search Report for FR 13 61528, dated Jun. 27, 2014.
French Written Opinion (Form FR 237) for FR 13 61528, dated Jun. 27, 2014.

* cited by examiner

*Primary Examiner* — Tom Black
*Assistant Examiner* — Tyler Paige
(74) *Attorney, Agent, or Firm* — Sughrue Mion, PLLC

(57) ABSTRACT

The invention relates to a method for controlling the manoeuvring of the landing gear of an aircraft, in which at least one of the steps of pulling on the doors of the bay to relieve the door retaining hook, actuating the door hook or hooks to free the doors and opening the doors is executed in response to the detection of a flight situation suitable for the occurrence of a manoeuvre order, even before the manoeuvre order is received.

2 Claims, No Drawings

METHOD FOR REDUCING THE APPARENT MANOEUVRING TIME FOR LANDING GEAR OF AN AIRCRAFT

CROSS-REFERENCE TO RELATED APPLICATIONS

This application relates to and claims the benefit of priority from French Patent Application number 13 61528, filed on Nov. 22, 2013, the entire disclosure of which is incorporated herein by reference.

The invention relates to a method for reducing the apparent manoeuvring time for landing gear of an aircraft.

TECHNICAL BACKGROUND OF THE INVENTION

Aircraft flying at a certain speed are equipped with retractable landing gear which can be manoeuvred between a deployed position and a retracted position in a bay of the aircraft, which is closed by doors. To that end, the doors are moved by a door actuator and retained in the closed position by one or more door hooks. Similarly, the landing gear is moved by a landing gear actuator and retained in the retracted position by a landing gear hook. The landing gear further comprises an unlocking actuator for unlocking it when it is locked in the deployed position and thus allowing it to be raised toward the retracted position.

The manoeuvre of deploying a landing gear generally comprises the following successive steps:
a. Pulling on the doors of the bay to relieve the door retaining hook;
b. Actuating the door hook or hooks to free the doors;
c. Opening the doors;
d. Pulling on the landing gear to relieve the landing gear retaining hook;
e. Actuating the landing gear hook to free the landing gear;
f. Moving the landing gear to bring it from the retracted position to the deployed position, causing the landing gear to be automatically locked when it reaches the deployed position;
g. Closing the doors, causing the retaining hook to be automatically rearmed when the doors reach the closed position.

The manoeuvre of raising a landing gear, for its part, comprises the following successive steps:
a. Pulling on the doors of the bay to relieve the door retaining hook;
b. Actuating the door hook or hooks to free the doors;
c. Opening the doors;
d. Unlocking the landing gear;
e. Moving the landing gear to bring it from the deployed position to the retracted position, causing the landing gear hook to be automatically rearmed when the landing gear reaches the retracted position;
f. Closing the doors, causing the door hook or hooks to be automatically rearmed when the doors reach the closed position.

These steps, which are generally initiated by the pilot actuating a control member (a button, a lever) take a certain time, typically ten to twenty seconds, especially since one must take into account the delay times, detections and confirmation of position, and the logical processing by the control unit which manages these manoeuvres.

There is currently a need to reduce this time, especially the sequence of raising the landing gear. Indeed, landing gear in the deployed position disrupts the airflow around the aircraft, is a source of noise, and forms an obstacle which must be retracted in order to ensure the safety of the aircraft.

A person skilled in the art would first think of increasing the size of the actuators which move the doors and the landing gear, in order to speed up the movement thereof. However, this solution is costly.

OBJECT OF THE INVENTION

The invention has the object of speeding up the manoeuvring of the landing gear in a simple manner.

PRESENTATION OF THE INVENTION

In order to achieve this aim, there is proposed a method for controlling at least one manoeuvre of deploying or retracting at least one landing gear of an aircraft, said manoeuvres comprising at least the following steps:

Deploying manoeuvre:
a. Pulling on the doors of the bay to relieve the door retaining hook;
b. Actuating the door hook or hooks to free the doors;
c. Opening the doors;
d. Pulling on the landing gear to relieve the landing gear retaining hook;
e. Actuating the landing gear hook to free the landing gear;
f. Moving the landing gear to bring it from the retracted position to the deployed position, causing the landing gear to be automatically locked when it reaches the deployed position;
g. Closing the doors, causing the retaining hook to be automatically rearmed when the doors reach the closed position.

Retracting manoeuvre:
a. Pulling on the doors of the bay to relieve the door retaining hook;
b. Actuating the door hook or hooks to free the doors;
c. Opening the doors;
d. Unlocking the landing gear;
e. Moving the landing gear to bring it from the deployed position to the retracted position, causing the landing gear hook to be automatically rearmed when the landing gear reaches the retracted position;
f. Closing the doors, causing the door hook or hooks to be automatically rearmed when the doors reach the closed position.

The method of the invention comprises the following actions:
before a manoeuvre order is received, and in response to the detection of a flight situation suitable for the occurrence of said manoeuvre order, executing at least one of the first three steps of the manoeuvre in question;
once the manoeuvre order has been received, executing the remaining steps of the manoeuvre.

Of course, the method is implemented by that computer of the aircraft which controls the landing gear. Thus, when the pilot or the on-board computer issues the order to manoeuvre the landing gear, some of the steps of the manoeuvre have already been carried out, which saves some time. Thus, the apparent duration of the manoeuvre, that is to say the time elapsed between the manoeuvre order and the end of the manoeuvre, is reduced.

This method may be implemented by a simple change in the programming of the computer which controls the landing gear, without changing the actuators of the doors and of the landing gear.

The takeoff and landing phases will now be described.

When the aircraft takes off, the landing gear is of course in the deployed position and the doors are closed and retained by the hook or hooks. Le computer which controls the landing gear detects a flight situation in which the landing gear might be retracted. In practice, this detection is made by the computer which monitors the outputs of sensors or flight information so as to carry out logical processing thereof.

For example, the flight situation in which the retracting manoeuvre order may occur is detected when the following logical condition is recognised as true by the computer:

the wheels of the landing gear are no longer in contact with the ground;

AND the speed of the aircraft is above a given threshold speed $Vs1$.

The first item of information is easily obtained by means of the "Weight on Wheels" sensor which is in general placed on the torque link of the landing gear and indicates if the suspension of the latter is unloaded, which is a sign that the wheels of the landing gear are no longer in contact with the ground. The second item of information comes from the inertial unit of the aircraft. The two items of information are processed by a logic circuit to trigger the execution of the first step or steps of the retracting manoeuvre.

In response to this detection, the computer orders the pulling on the doors, the actuating of the door hook or hooks, and the opening of the doors (or only the first two steps, or only the first step). From that point, when the pilot presses the button to retract the landing gear and thereby issues the order for the retracting manoeuvre, the computer need only execute the remaining steps of the retracting manoeuvre. The time saved in this way is not inconsequential since it may be as much as several seconds.

During landing, the landing gear is retracted in its bay and retained by the landing gear hook, and the doors are closed and retained by the door hook or hooks. The computer which controls the landing gear monitors the outputs of the sensors and the flight information so as to carry out logical processing thereof.

For example, the flight situation in which the deploying manoeuvre order may occur is detected when the following logical condition is recognised as true by the computer:

the speed of the aircraft is below a given threshold speed $Vs2$;

AND (the height above the ground is below a given threshold height $H1$ OR the flaps are deployed).

In response to this detection, the computer orders the pulling on the doors, the actuating of the door hook or hooks, and the opening of the doors (or only the first two steps, or only the first step). From that point, when the pilot presses the button to deploy the landing gear and thereby issues the order for the deploying manoeuvre, the computer need only execute the remaining steps of the deploying manoeuvre. The time saved in this way is not inconsequential since it may be as much as several seconds.

It will be noted that the first three steps are common to the two manoeuvres. They may therefore be ordered as soon as a flight situation suitable for the occurrence of a deploying manoeuvre order or a retracting manoeuvre order is detected.

The invention claimed is:

1. A computer-based method for controlling the efficient deployment of a landing gear of an aircraft through doors of a landing gear bay, comprising:
   (a) detecting by the computer when the following logical condition is true:
      (i) sensing by an aircraft inertial unit when speed of the aircraft is above a given threshold speed $Vs2$, and
      (ii) sensing at least one of a deployment of aircraft flaps and a height above the ground being below a predetermined threshold;
   (b) initiating automatically by said computer a first stage deployment manoeuver comprising at least one of the following steps:
      (i) pulling on the doors of the bay to relieve a door retaining hook;
      (ii) actuating the door hook or hooks to free the doors; and
      (iii) opening the doors; and
   (c) receiving by said computer a deployment manoeuver order from a user and, in response to said order, automatically controlling by said computer a second stage deployment manoeuver comprising the following steps:
      (i) pulling on the landing gear to relieve the landing gear retaining hook;
      (ii) actuating a landing gear hook to free the landing gear;
      (iii) moving the landing gear to bring it from a retracted position to a deployed position, causing the landing gear to be automatically locked when it reaches the deployed position; and
      (iv) closing the doors, causing the retaining hook to be automatically rearmed when the doors reach the closed position,
   whereby the computer is operative efficiently to execute and control only a part of a landing gear deployment sequence in response to a user deployment order.

2. A computer-based method for controlling the efficient retraction of a landing gear of an aircraft through doors of a landing gear bay, comprising:
   (a) detecting by the computer when the following logical condition is true:
      (i) sensing by a load sensor when wheels of the landing gear are no longer in ground contact, and
      (ii) sensing by an aircraft inertial unit when speed of the aircraft is above a given threshold speed $Vs1$;
   (b) initiating automatically by said computer a first stage retraction manoeuver comprising at least one of the following steps:
      (i) pulling on the doors of the bay to relieve a door retaining hook;
      (ii) actuating the door hook or hooks to free the doors; and
      (iii) opening the doors; and
   (c) receiving by said computer a retraction manoeuver order and, in response to said order, automatically controlling by said computer a second stage retraction manoeuver comprising the following steps:
      (i) unlocking the landing gear;
      (ii) moving the landing gear to bring it from the deployed position to the retracted position, causing the landing gear hook to be automatically rearmed when the landing gear reaches the retracted position; and
      (iii) closing the doors, causing the door hook or hooks to be automatically rearmed when the doors reach the closed position,
   whereby the computer is operative efficiently to execute and control only a part of a landing gear retraction sequence in response to a user retraction order.

* * * * *